Patented Jan. 2, 1934

1,942,390

UNITED STATES PATENT OFFICE 1,942,390

PROCESS FOR MAKING BENZOIC ACID

Courtney Conover, St. Louis, Mo., assignor, by mesne assignments, to Monsanto Chemical Company, a corporation of Delaware No Drawing. Application November 15, 1929
Serial No. 407,577

14 Claims. (Cl. 260—108)

This invention relates to the manufacture of benzoic acid, my present application being a continuation in part of my pending application for patent Serial No. 286,487, filed June 18, 1928.

The invention forming the subject-matter of my said pending application for patent consists of a process for making benzoic acid which comprises heating a mixture of molten phthalic anhydride and a suitable catalyst in the presence of steam or water in any other form. The invention herein described also consists of a process for making benzoic acid by heating a mixture of molten phthalic anhydride and a suitable catalyst in the presence of water, but my present application is distinguished from my said pending application, Serial No. 286,487, in the following respects:

1st. It contains claims directed specifically to the use of certain catalysts disclosed in my said pending application and covered broadly but not specifically by the claims of said pending application;

2nd. It discloses certain catalysts not specifically described in my said pending application; and 3rd. It discloses a distinct method or procedure which is not described in my said pending application.

In producing benzoic acid by procedure that contemplates heating a mixture of molten phthalic anhydride with a decarboxylating catalyst in the presence of steam or water, I have found that when a chromium compound is mixed with one or more compounds of other metals, including aluminum, sodium, potassium, calcium, copper or nickel, particularly such compounds as are capable of reacting with the chromium compound or with phthalic acid to form the corresponding metallic phthalate, the reaction between the phthalic anhydride and the steam or water is accelerated thereby. In general the metallic salts of weak acids, oxides or hydroxides react with the phthalic anhydride or phthalic acid readily and are therefore well suited for this purpose. I have also found that improved results are obtained if the mixture of molten phthalic anhydride and catalyst is subjected to the action of steam or water without withdrawing the benzoic acid product from the reaction vessel, as said product is formed. When only 5% or less of the phthalic anhydride remains, the benzoic acid may be separated from the mixture by distillation.

The process may be carried out in many different ways and with various kinds of apparatus, but one procedure that I have found to be satisfactory consists of introducing crude phthalic anhydride into a covered kettle provided with an agitating mechanism, and adding to said phthalic anhydride a catalyst consisting of 3 parts of chromic phthalate and 2.35 parts of sodium phthalate for every 100 parts phthalic anhydride. The said mixture is heated until it reaches a temperature of approximately 220° C. and water is thereafter admitted to the reaction mixture, preferably in the form of steam that is introduced below or near the surface of the mixture at the rate of 5–20 parts per hour for each 100 parts phthalic anhydride in the reaction kettle. The mixture is agitated throughout the reaction period, and the reaction is allowed to proceed until analysis of the reaction mixture shows only 5% or less of phthalic anhydride in the mixture. Thereafter, the benzoic acid is separated from the reaction mixture in any suitable way, as, for example, by distillation with or without the aid of steam.

A more complete separation of the benzoic acid from the unreacted phthalic anhydride or phthalic acid may be obtained by adding enough soda ash, lime or other alkali or alkaline earth metal compound to the mixture to combine and thereby fix the phthalic acid or anhydride. The catalyst contained in the residue may be used again in succeeding batches and eventually may be recovered advantageously by dissolving the residue in a solution of soda ash. The metal precipitate may be separated by filtration or decantation after which it is charged again into the reaction kettle for subsequent use.

The preferred temperature range extends from 200 to 250° C. At 220° C. the reaction progresses rapidly and smoothly. Moreover, at this temperature the reacting conditions are not difficult to maintain.

Another catalyst which I have discovered gives even better results than the catalysts above described, consists of a mixture containing 4 parts of sodium dichromate, 1 part nickel carbonate and 0.25 parts cupric carbonate for each 100 parts of phthalic anhydride employed in the reaction batch. If desired, chromic oxide mixed with sodium or potassium hydroxide may be used in place of the sodium dichromate in the mixture just referred to.

While water in the form of steam is preferred in conducting the reaction, I wish it to be understood that it is immaterial in what form the water is used. The water which undergoes reaction may be introduced into the reaction zone in the form of a liquid, vapor, a component of the catalyst, or it may have its origin in a chemically combined form such as phthalic acid (phthalic acid tends to liberate water with the formation of phthalic anhydride at the temperature of the decarboxylation reaction—the equilibrium between phthalic acid and phthalic anhydride and water, favors the formation of the anhydride as the temperature increases).

In its broad sense therefore, the term "water" is to be understood as contemplating water of varied origin including liquid water, steam, as well as water which is liberated or otherwise rendered available under the conditions of the reaction from a combined form as from phthalic acid.

The reaction may be represented as follows:

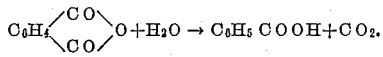

$$C_6H_4\diagdown^{CO}_{CO}\diagup O + H_2O \rightarrow C_6H_5COOH + CO_2.$$

It will be apparent to those skilled in the art that my present invention enables one to complete the conversion of phthalic anhydride to benzoic acid without experiencing any difficulties in the separation of the product from the raw materials as formed. Moreover, the reaction can be accelerated many fold, due to the fact that the catalyst herein disclosed possesses greater activity than chromium alone. While I have herein described several ways of practising my invention, I wish it to be understood that various changes or modifications may be made both in the procedure employed and the catalyst used, without departing from the spirit of my invention.

Attention is drawn to my copending application, Serial Number 668,811, which is directed broadly to the decarboxylation of polycarboxylic acids and anhydrides in a molten state and to the utilization of compounds of chromium either alone or in combination with other metallic compounds as catalysts for decarboxylating reactions.

Having thus described my invention, what I claim as new and desire to secure by Letters Patent is:

1. A process for making benzoic acid, which comprises reacting molten phthalic anhydride and water in the presence of a decarboxylating catalyst until substantially all of the phthalic anhydride has been converted into benzoic acid, and subsequently separating the benzoic acid.

2. A process for making benzoic acid, which comprises reacting molten phthalic anhydride and water in the presence of a compound of chromium and a compound of at least one element selected from a group consisting of nickel, copper, aluminum, sodium and potassium, the reaction being continued until substantially all of the phthalic anhydride has been converted into benzoic acid, and subsequently separating the product.

3. The method of manufacturing benzoic acid which is characterized in that molten phthalic anhydride and water are caused to react in the presence of a decarboxylating catalyst containing compounds of the metallic elements of an alkali metal chromate.

4. The method of manufacturing benzoic acid which is characterized in that molten phthalic anhydride and water are caused to react in the presence of a decarboxylating catalyst containing compounds of the metallic elements of sodium chromate.

5. The method of manufacturing benzoic acid which is characterized in that molten phthalic anhydride and water are caused to react in the presence of a decarboxylating catalyst containing compounds of the metals of an alkali chromate and a compound of at least one additional metal which is capable of existing in a chemically combined form as a phthalate.

6. The method of manufacturing benzoic acid which is characterized in that molten phthalic anhydride and water are caused to react in the presence of a decarboxylating catalyst containing a compound of chromium and a compound of an additional metallic element which element is capable of existing in a combined form as a phthalate.

7. The method of manufacturing benzoic acid which is characterized in that molten phthalic anhydride and water are caused to react in the presence of a compound of chromium and a compound of at least one additional element selected from a group consisting of: sodium, potassium, calcium, nickel and copper.

8. The method of manufacturing benzoic acid which is characterized in that molten phthalic anhydride and water are caused to react in the presence of a catalyst containing compounds of the elements, chromium, an alkali metal and copper.

9. The method of manufacturing benzoic acid which is characterized in that molten phthalic anhydride and water are caused to react in the presence of a decarboxylating catalytic agent embodying phthalates of a plurality of metals.

10. The method of manufacturing benzoic acid which is characterized in that molten phthalic anhydride and water are caused to react in the presence of a decarboxylating agent embodying phthalates of a plurality of metals, one of which is chromium.

11. The method of producing benzoic acid and carbon dioxide from phthalic anhydride and water which comprises introducing water into a molten reaction mixture containing phthalic anhydride and a decarboxylating catalyst, said catalyst embodying a compound of chromium and a compound of at least one additional element selected from a group consisting of: sodium, potassium, calcium, nickel and copper; the temperature of the reaction mixture and the pressure within the reaction vessel being such as to avoid an accumulation of a liquid water phase, continuing the reaction until substantially all of the phthalic anhydride has been converted to benzoic acid and subsequently distilling the benzoic acid from the reaction vessel.

12. The method of producing benzoic acid and carbon dioxide from phthalic anhydride and water which comprises introducing water into a molten reaction mixture containing phthalic anhydride and a decarboxylating catalyst embodying compounds of chromium and of an alkali metal, the temperature of the reaction mixture and the pressure within the reaction vessel being such as to avoid an accumulation of a liquid water phase, continuing the reaction until substantially all of the phthalic anhydride has been converted to benzoic acid and subsequently distilling the benzoic acid from the reaction vessel.

13. The method of producing benzoic acid and carbon dioxide from phthalic anhydride and water which comprises introducing water into a molten reaction mixture containing phthalic anhydride and a decarboxylating catalyst embodying phthalates of a plurality of metals, one of which is chromium, the temperature of the reaction mixture and the pressure within the reaction vessel being such as to avoid an accumulation of a liquid water phase, continuing the reaction until substantially all of the phthalic anhydride has been converted to benzoic acid and subsequently distilling the benzoic acid from the reaction vessel.

14. The method of converting phthalic anhydride into benzoic acid that comprises reacting molten phthalic anhydride in the presence of a decarboxylating catalyst whereby carbon dioxide is evolved by introducing water into the reaction mixture, the temperature of the mixture being such as to avoid the presence of a liquid water phase, continuing the reaction until substantially all of the phthalic anhydride is converted to benzoic acid and subsequently distilling the benzoic acid from the reaction mixture.

COURTNEY CONOVER.

CERTIFICATE OF CORRECTION.

Patent No. 1,942,390.  January 2, 1934.

COURTNEY CONOVER.

It is hereby certified that error appears in the printed specification of the above numbered patent requiring correction as follows: Page 2, line 111, claim 10, after "embodying" insert the words water soluble; and that the said Letters Patent should be read with this correction therein that the same may conform to the record of the case in the Patent Office.

Signed and sealed this 7th day of August, A. D. 1934.

Leslie Frazer (Seal)  Acting Commissioner of Patents.